US006033089A

United States Patent [19]

Tesauro

[11] Patent Number: 6,033,089

[45] Date of Patent: Mar. 7, 2000

[54] DECORATIVE ELECTRIC LUMINARIA WITH PERIPHERAL FLANGE SUPPORTS

[76] Inventor: Samuel J. Tesauro, 31711 Ridgeside Dr., Farmington Hills, Mich. 48334

[21] Appl. No.: 09/053,984

[22] Filed: Apr. 2, 1998

[51] Int. Cl.[7] .................... B64F 85/20

[52] U.S. Cl. .................... 362/249; 362/124; 362/153; 362/152; 362/153.1; 362/219; 362/237; 362/236; 362/363; 362/364; 362/808

[58] Field of Search .................... 362/124, 153, 362/152, 153.1, 219, 237, 249, 236, 363, 364, 808

[56] References Cited

U.S. PATENT DOCUMENTS

| | | | |
|---|---|---|---|
| 3,461,283 | 8/1969 | Hahn | 240/78 |
| 3,965,597 | 6/1976 | Noellert | 40/130 |
| 4,234,915 | 11/1980 | Malinowski et al. | 362/363 |
| 4,567,548 | 1/1986 | Schneeberger | 362/161 |
| 4,719,548 | 1/1988 | Orosz | 362/309 |
| 5,021,935 | 6/1991 | Gary | 362/237 |
| 5,034,868 | 7/1991 | Stelfox et al. | 362/352 |
| 5,178,451 | 1/1993 | Henry | 362/161 |
| 5,264,996 | 11/1993 | Bele, Jr. et al. | 362/162 |
| 5,274,537 | 12/1993 | Altman | 362/152 |
| 5,567,045 | 10/1996 | Bucek | 362/806 |
| 5,651,669 | 7/1997 | Henry | 362/161 |
| 5,791,774 | 8/1998 | Briles | 362/153 |

*Primary Examiner*—Sandra O'Shea
*Assistant Examiner*—Ronald E. DelGizzi
*Attorney, Agent, or Firm*—Young & Basile, PC

[57] ABSTRACT

Electric luminaria is made by a unique method from a one-piece blow molded container having a neck formed at one end of a base, an intermediate radially outward extending flange at an opposite end of the base and a hollow shell extending from the flange. The flange is peripherally cut to form two flanges, one attached to the shell and one attached to the base. The base has an aperture formed in the neck for receiving a light socket therein, with the electric conductors extending from the light socket passing through the neck and over the peripheral flange of the base. The shell is placed over the base with the peripheral flanges of the base and the shell disposed in an overlapping arrangement. Stakes are inserted through aligned apertures in the flanges of the shell and base to fix the luminaria on the ground. A decorative sleeve is replaceably mounted about the sidewall of the shell.

15 Claims, 4 Drawing Sheets

DECORATIVE ELECTRIC LUMINARIA WITH PERIPHERAL FLANGE SUPPORTS

BACKGROUND OF THE INVENTION

1. Field of the Invention

The present invention relates, in general, to luminaria and, more specifically, to electric luminaria.

2. Description of the Art

Luminaria are frequently used during Christmas holidays as an attractive decoration, particularly on Christmas Eve. Generally, the luminaria include candles placed in a transparent bag along with a weight, such as sand, dirt or a brick. The luminaria are typically used in large numbers arranged in rows to outline the driveway and/or sidewalk of a house.

Typically, luminaria are used for only one night, such as on Christmas Eve, and then are discarded. While the luminaria are quite decorative, it is time consuming to accumulate the various elements of the luminaria and then prepare and deploy the large numbers of luminaria. Sand, dirt, or bricks, etc., must be obtained and placed in each bag. Each candle must be lit by hand outside the bag and carefully placed inside the bag or lit inside the narrow confines of the interior of the bag through the open end of the bag. Wind, rain and snow frequently extinguish the candles thereby requiring re-lighting and the lighting difficulties enumerated above. The candles must be placed directly in the center of the bag to prevent igniting of the bag.

Another problem with previously devised luminaria is cleanup the following morning after use. The bags, sand and candle remains must be removed from the sidewalk and driveway and discarded or, in case of more permanent luminaria, stored for the following year. However, the damp conditions which typically exist during the Christmas season in most localities cause deterioration of the bags and frequent spillage of the sand which then must be picked up by hand further lengthening cleanup efforts.

Electric luminaries have been devised to address these problems and to enable the use of luminaria over and over again, such as on consecutive Christmas holidays. However, such electric luminaria use strands of Christmas lights which are individually supported on a frame mounted in a paper bag. As disclosed in U.S. Pat. No. 5,034,868, the frame legs receive spikes to stationarily affix the frame and bag to the ground.

However, the paper bags are still susceptible to deterioration which frequently limits the use of such electric luminaria to only one night use without extensive re-deployment and cleanup between consecutive nights or the repurchase and re-installation in new bags.

Thus, it would be desirable to provide electric luminaria which overcomes the problems encountered with the use of prior luminaria. It would be desirable to provide electric luminaria which can be easily used on multiple nights without intervening cleanup or re-preparation. It would also be desirable to provide electric luminaria which can be easily set up and removed without extensive effort. It would also be desirable to provide electric luminaria which is easy to store in a compact space.

U.S. Pat. No. 5,567,045 discloses decorative covers in the form of hinged sections which are securable over the mounting post of an outdoor garden light. The covers formed in decorative shapes, such as the shape of a pumpkin, Christmas tree, etc. However, such decorative covers require special molds for each different design thereby resulting in a high product cost. Further, such decorative covers are mounted on existing garden and landscaping lights which are typically not positioned in the same location or at the relatively close spacing as are luminaria.

SUMMARY OF THE INVENTION

The present invention is an electric luminaria and a method of making same. The electric luminaria is usable with lights mounted in light sockets spaced along an electric conductor.

The luminaria includes a shell having a side wall and an interior light support means mountable in the bottom of the shell and within the interior of the shell for supporting a light socket in the shell, and means for interconnecting each shell and one light support means. The shell has a sidewall surrounding a hollow interior chamber and a flange at one end of the sidewall surrounding an aperture opening to the hollow interior chamber. A base has a flange at one end complementary to the flange on the shell, and a receptacle at an opposed end adapted for supporting one light socket. The base is oriented to dispose the receptacle within the hollow interior chamber of the shell, with the flange of the base in mating relationship with the flange and the shell. Alignable apertures formed in the flanges on the base and the shell receive stake means, insertable through the aligned apertures, to fix the base to the ground. The electric luminaria is made by the process comprising the steps of: molding a one-piece hollow container having a base at one end terminating in a neck, an intermediate, radially outwardly extending flange at one end of the base and a closed end shell extending from the flange; separating the base from the shell at the flange leaving a peripheral flange at one end of the base and a peripheral flange at one end of the shell; inverting the base from its manufactured position relative to the shell; inserting a light socket into one end of the base; disposing the base within the interior of the shell, and bringing the peripheral flanges of the base and the shell into mating engagement.

The electric luminaria of the present invention has a durable construction for repeated uses. The electric luminaria is easy to set up and remove and can be easily nested and stacked into sets in a small space for convenient storage between uses. The electric luminaria of the present invention also uniquely receives a decorative sleeve which may be provided in different appropriate colors and/or with different insignia, symbols or other indicia to enable the electric luminary of the present invention to be used for different occasions and holidays, not just at Christmas.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
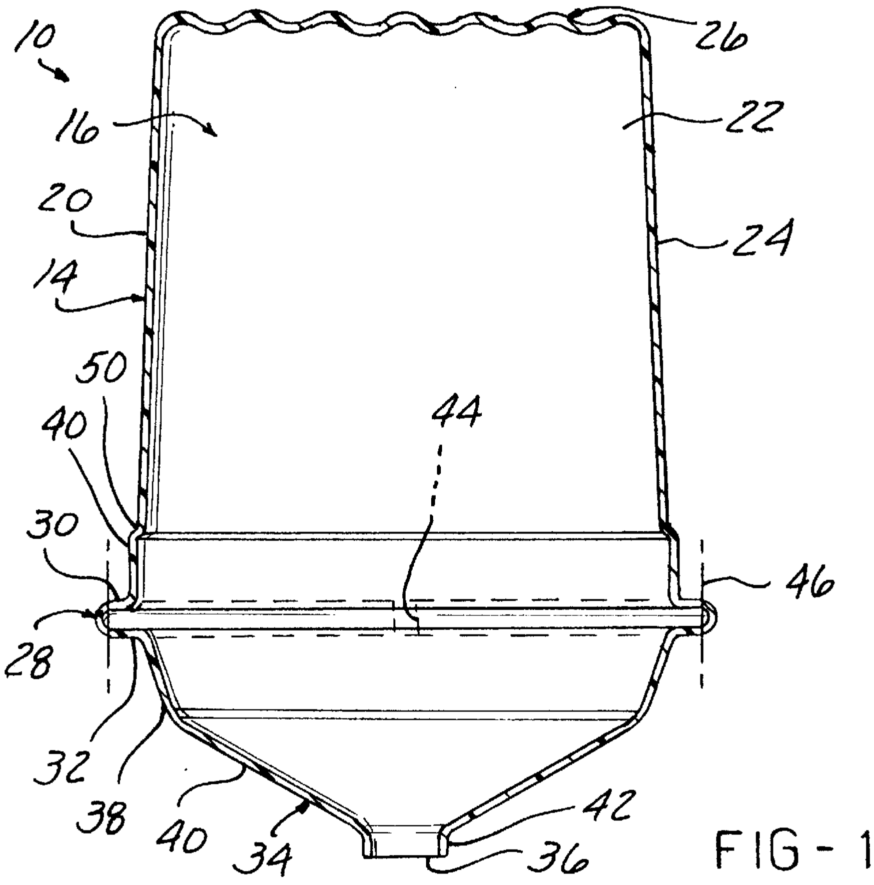
FIG. 1 is a side elevational view of a one-piece container including the shell and base of the electric luminary of the present invention prior to separation.
Figure 3:
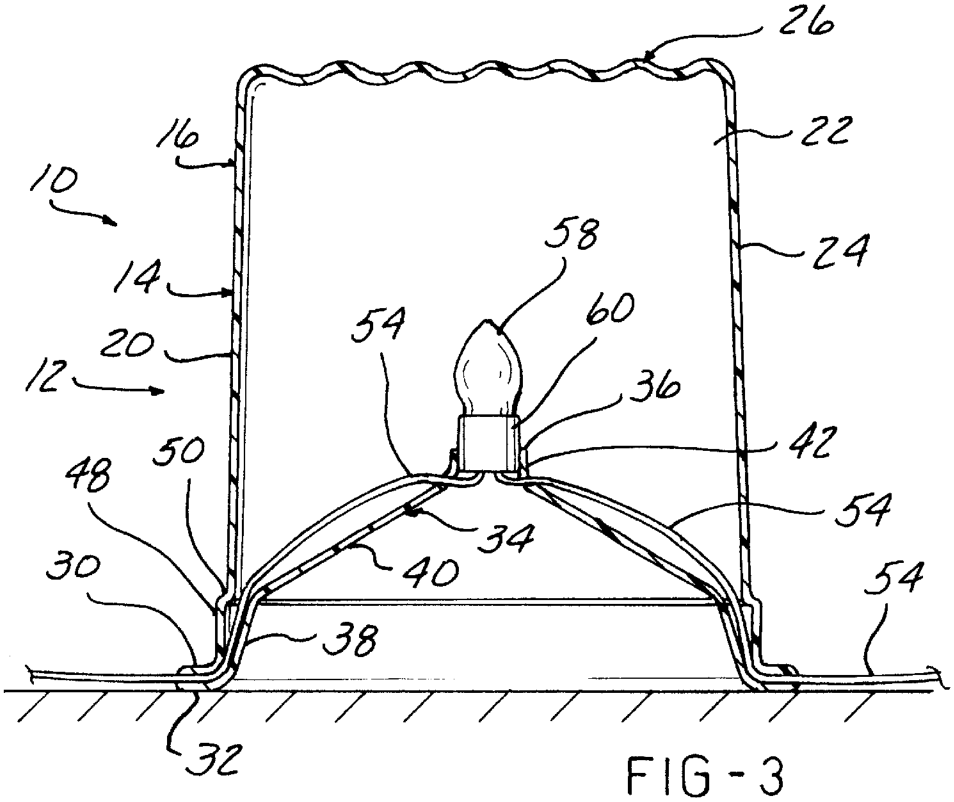
FIG. 3 is a side, lateral cross-sectional view of the assembled shell and base shown in FIG. 2.

Referring now to the drawings ant to FIGS. 1–5 in particular, there is depicted an electric luminaria 10 suited for multiple night use and capable of receiving interchangeable decorative sleeves extending the use of the luminaria to different holidays and occasions.

The following description of the best mode of making and constructing the electric luminaria 10 of the present invention is described and shown in FIGS. 1–5. It will be understood, however, that the electric luminaria 10 may be constructed by other methods without departing from the scope of the present invention.

In a preferred embodiment, as shown in FIG. 1, the electric luminaria 10 of the present invention is initially formed as an enlarged, one piece, integral, hollow container 12.

The container 12 is preferably formed of a suitable, lightweight, translucent, clear or colored material. Preferably, polyethylene is employed to construct the container 10. Further, container 10, which may be formed by any suitable molding process, is preferably formed by blow molding with a thin outer wall.

As shown in FIG. 1, the container 12 is formed of a shell portion 14 having an exterior sidewall 16 which may take any of a number of different shapes. Although the sidewall 16, in a preferred embodiment shown in FIGS. 1–5, has a generally rectangular shape formed of edge interconnected sidewalls 18, 20, 22 and 24, with sidewalls 18 and 22 being identical and longer in width than the opposed identical sidewalls 20 and 24. Alternately, the sidewall 16 of the shell 14 may have a square shape, a cylindrical shape, or any other polygonal or geometric shape.

Further, although the first or top end 26 of the shell 14 is preferably closed and integrally formed with the side wall 16, it will be understood that the shell 14 may also be formed with an open top end 26. Further, top end 26, in an exemplary preferred embodiment, is formed with a generally rippled or undulating cross-section simulating the open top end of a paper bag conventionally employed with Christmas luminaria. It will be understood that the closed top end 26 may also be formed with other configurations, such as a generally smooth, planar shape.

Referring again to FIG. 1, the container 12 is formed with an intermediate peripheral flange denoted generally by reference number 28. Preferably, the flange 28 is formed of opposed first and second peripheral flange portions or flanges 30 and 32 which are spaced apart by an internal space during the blow molding of the container 12. Flanges 30 and 32 have a shape generally consistent with the shape of the sidewall 16, such as a rectangular shape in the illustrated embodiment of the container 12.

A base or second portion 34 projects from the second flange 32 to an end 36. The base 34 may take a number of different configurations with the configuration described hereafter being understood as an example only. Thus, in a preferred embodiment, the base 34 includes a first inclined or angled wall 38 projecting at an obtuse angle from the second flange 32. The first wall 38 smoothly merges into a further angled second wall 40. The second wall 40 merges into a generally cylindrical cross-section neck 42 which terminates in the end 36. During the blow molding process, an aperture is formed in the end 36 of the base 34 in communication with the hollow interior of the container 12.

Figure 2:
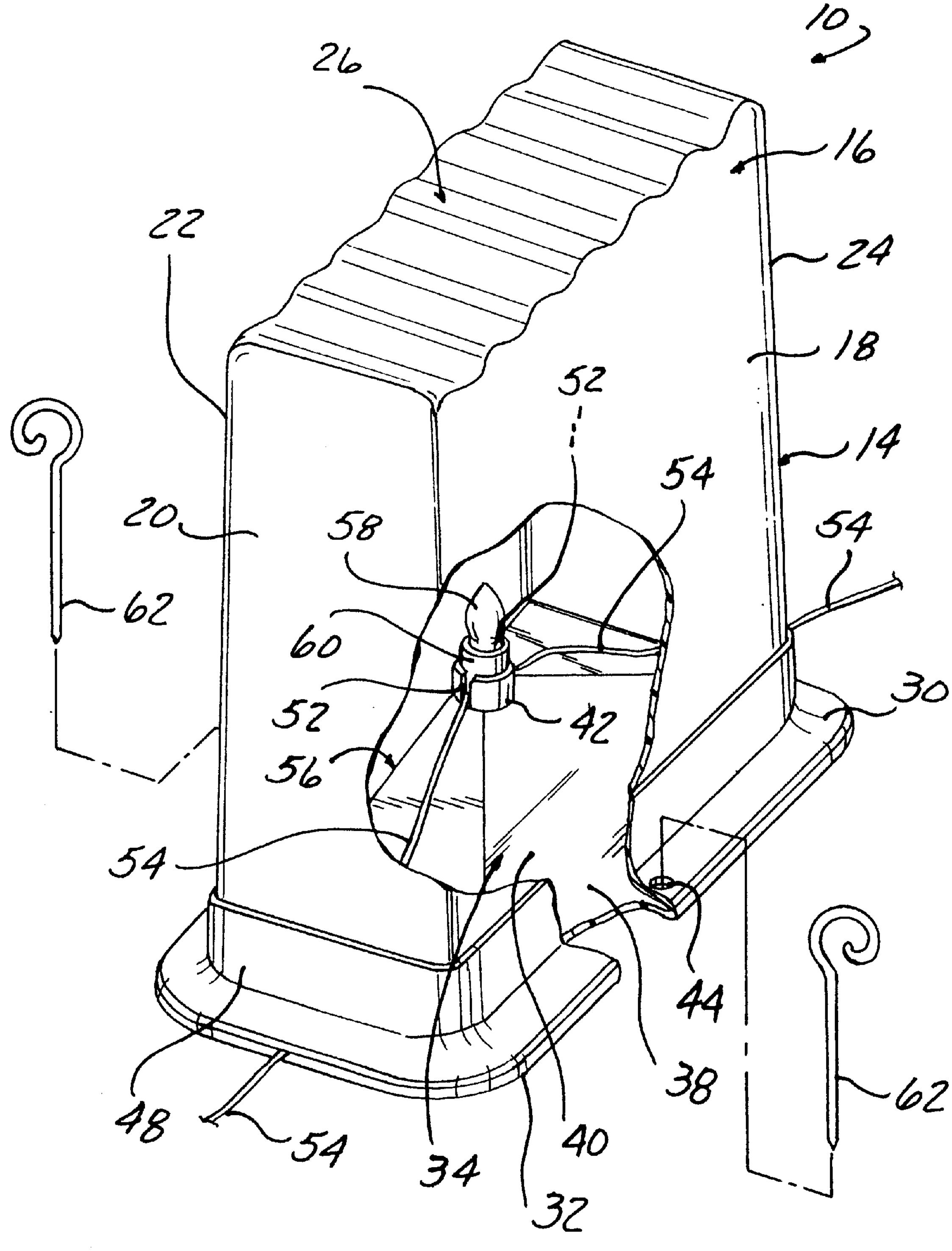
FIG. 2 is a partially broken away, partially exploded, perspective view of the assembled shell and base of the electric luminaria of the present invention.

As shown in FIG. 2, at least one and preferably a pair or more apertures 44 are formed in and through the flanges 30 and 32. By example only, the apertures 44 are formed through the flanges 30 and 32 adjacent to and centrally located between opposite ends of the sidewalls 18 and 22 of the shell 14. The apertures 44 may be formed during the blow molding process or subsequent thereto by means of a separate piercing or other forming operation. Additional apertures 44 may also be formed in the flange; 30 and 32 adjacent the smaller sidewalls 20 and 24; although such is not necessary for stationary fixing of the electric luminaria 10 to the ground, as described hereafter.

According to the unique process or method of manufacturing the electric luminaria 10 of the present invention, the flanges 30 and 32 are separated by means of a cut made through the flanges 30 and 32 along cut line 46. Cut line 46 is preferably located just inside of the outer edge of the container 12 joining the flanges 30 and 32. In this way, formation of the cut line 46 separates the flanges 30 and 32 as well as the shell 14 and the base 34 respectively formed therewith.

As shown in FIGS. 1 and 2, the sidewalls 20, 22, 24 and 26 of the shell 14 are formed, in a preferred embodiment, with a first lower, annular band portion, each denoted by reference number 48. The sidewalls 18, 20, 22 and 24 taper slightly, angularly inward from the upper edge of the annular band 48 to the top end 26. The juncture between the upper edge of the annular band 48 and the lower edge of each sidewall 18, 20, 22 and 24 forms a shoulder 50 which acts as a stop for a replaceable decorative sleeve slideably mountable over the sidewall 16 of the shell 14, as described hereafter.

The base 34, as shown in FIG. 2, has a pair of opposed apertures 52, typically in the form of slots formed on diametrically opposed sides of the neck 42. The slots 52 are adapted to receive the electric conductors 54 on a string of lights 56 as described in greater detail hereafter.

In assembling the electric luminaria 10 of the present invention, the conductor(s) 54 of an electric light string are stretched out on the ground with each light 58 and light socket 60 placed adjacent to a position where it is desired to locate one of the electric luminaria 10. By example only, the electric string 56 is in the form of a 50 foot outdoor electric conductor 54 carrying ten light sockets 60 spaced five feet apart. A 2½ foot conductor leader and a 2½ foot conductor tail extend from the first and last light socket 60 on the conductors 54 and are connected to suitable electric connectors, not shown, for connecting the lights 58 to a source of electric power or to an extension chord or even to another string of lights 56.

Any light 58 may be employed with a complementary socket 60. For example, five watt candle or candelabra type lights 58 are shown, by way of example only.

At each potential location of an electric luminaria 10, one base 34 is inverted from the manufactured position shown in FIG. 1 and placed on the ground with the peripheral flange 32 resting on the ground at the location where it is desired to locate one electric luminaria 10. The light socket 60 is then placed in the aperture in the end 32 of the neck 42 of the base 34, with the electric conductors 54 extending outward through the slots 52 in the neck 42.

The shell 14 is then placed over the base 34 with the flange 30 of the shell 14 overlaying the flange 32 of the base 34. The conductors 54 extend outward of the luminaria 10 between the flanges 30 and 32. In this position, the apertures 44 in the flanges 30 and 32 are aligned and are capable of receiving suitable stake means, such as a metal or plastic stake 62 shown in FIG. 2. The stakes 62 secure the shell 14 and base 34 of each luminaria 10 in a fixed position on the ground.

This assembly process is repeated for other luminaria 10 until each light 58 on the light string 56 is mounted in one luminaria 10. One end of the light string 56 is then connected to a source of electric power in a conventional manner.

Figure 4:
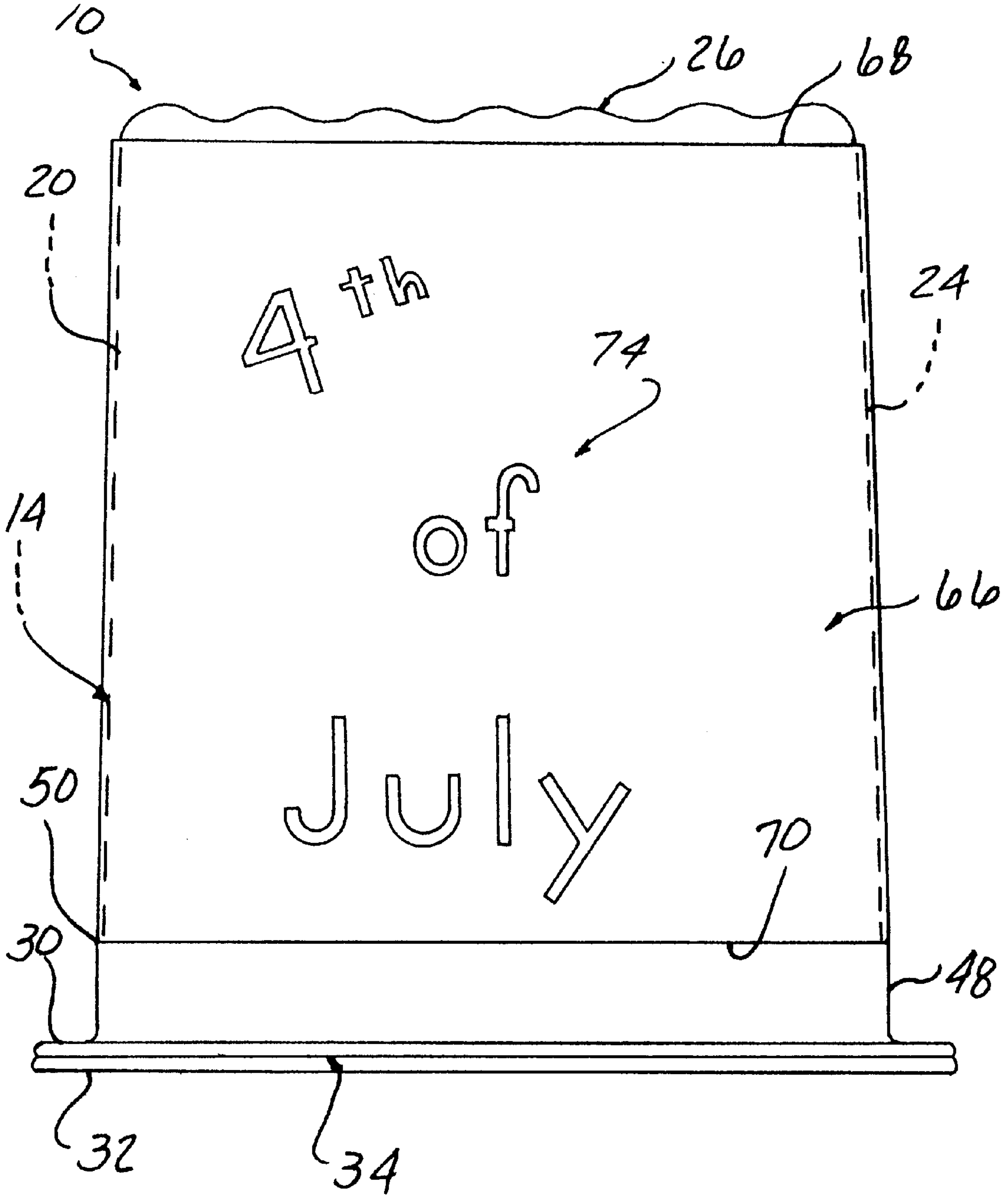
FIG. 4 is a side-elevational view of the electric luminaria of the present invention with a decorative sleeve.

Referring now to FIG. 4, there is depicted a decorative sleeve 66 which is removably implacable over the shell 14. The sleeve 66 is in the form of an elongated band which may have opposed ends releasibly or permanently joined together. Preferably, the sleeve 66 is formed of an integral, one piece, annular, continuous member.

The sleeve 66 has opposed open ends 68 and 70. It will be understood, however, that one of the ends, such as the end 68 can be closed and disposed in an overlaying relationship to the top end 26 of the shell 14 of one of the electric luminaria 10.

The sleeve 66 is preferably formed of a suitable, heat resistant, material, such as a plastic suited for long-term exterior use. By way of example only, the sleeve 66 is formed of a polyethylene material having a small amount of elasticity to snugly fit over and remain secured on sidewalls 18, 22 and 24 of the shell 14. In this mounting position, the bottom edge adjacent the open end 70 seats on the shoulder 50 on the exterior of the sidewalls 18, 20, 22 and 24 of the shell 14. This positions the annular band 48 free of the sleeve 48 to potentially provide contrast between the color or decorative appearance of the sleeve 66 and the color of the sleeve 48. It will also be understood that the sidewalls 18, 22 and 24 of the shell 14 may be formed with a continuous, inclined surface without the annular sleeve 48. In this construction, the sleeve 66 may be formed with a width to fit over the entire length of each of the sidewalls 18, 20, 22 and 24, with the bottom edge 70 resting on the flange 30.

The decorative sleeve 66 may be provided with any decorative appearance, indicia, color, etc., or combination of the above. For example, the decorative sleeve 66 may be provided in different colors or multiple colors, associated with different seasons, occasions, holidays, etc. For example, the sleeve 66 could have an orange color for use at Halloween. In such an application, the orange colored sleeve 66 could simply be provided in an orange color or with added indicia, such as a black pumpkin face. Other colors may also be employed, such as green for St. Patrick's Day, red and green for Christmas, pastel colors for Easter, or red, white and blue for the Fourth of July, etc. In addition to or separate from the use of different colors on the sleeve 66, each sleeve may also be imprinted or otherwise formed with suitable indicia 74 creating a saying or identifying a particular holiday, such as letters spelling out "4th of July", "Happy Easter", "Merry Christmas", "BOO!", etc.

In this manner, a single set of electric luminaria 10 constructed in accordance with the present invention may be employed at multiple times throughout the year and provided with different decorative sleeves 66 suited for use at each specific occasion. The durable construction of the electric luminaria 10 insures that the electric luminaria 10 may be repeatedly used over a long time. Further, the two part construction of the base 34 and shell 14 enable the electric luminaria to be quickly and easily assembled and then disassembled.

Figure 5:
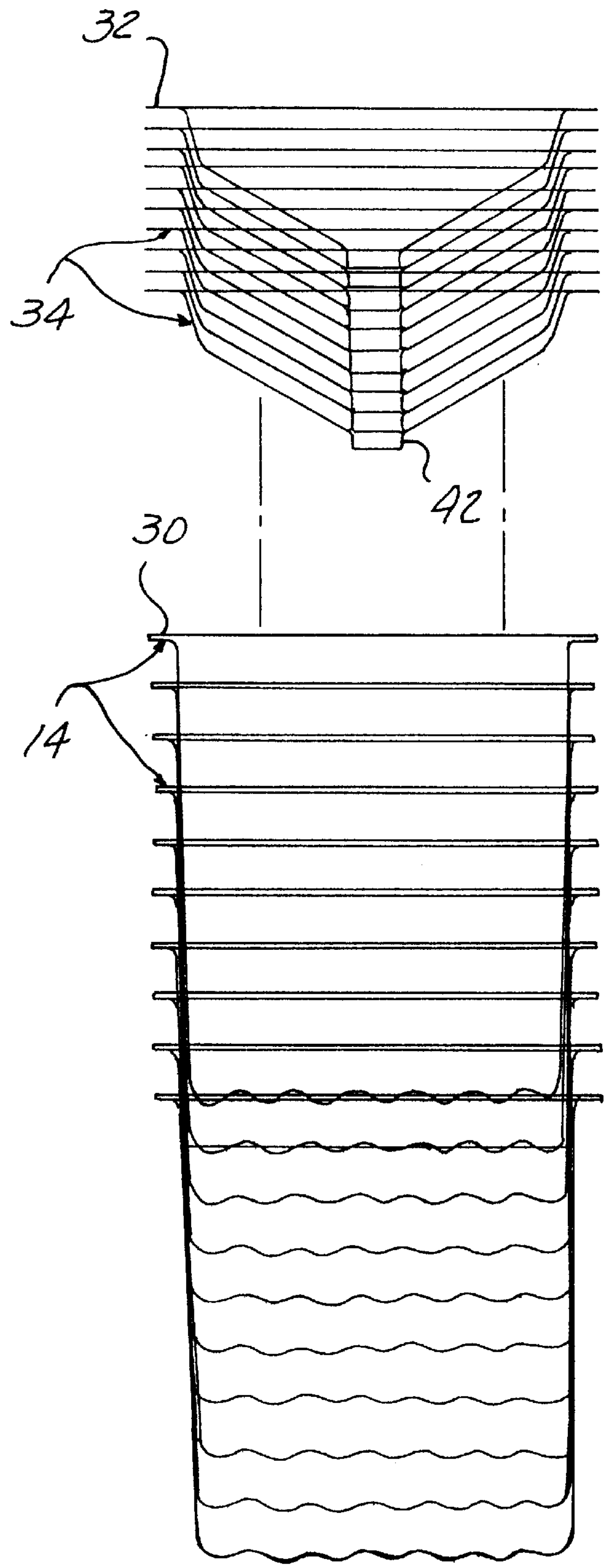
FIG. 5 is an exploded, cross-sectional view showing the stacking of the shells and bases for storage.

Furthermore, as shown in FIG. 5, the construction of the base 34 and the shell 14 described above also lends itself for easy compact storage stacking. All of the bases 34 of a plurality of electric luminaria 10, such as ten luminaria, may be nested within each other in a stack having an overall height significantly less than combined heights of each base 34. Similarly, all of the shells 14 of one set of electric luminaria 10 may also be nested together in one stack. The stack of bases 34 are then inserted into the open end of the stack of shells 14.

In summary, there has been disclosed a unique electric luminaria which is constructed for long term, durable use. The electric luminaria has a simplified construction for easy and quick assembly and disassembly. Since the luminaria utilizes electric lights, re-lighting of conventional prior art candle luminaria is eliminated. The electric luminaria may also be disassembled into to separate bases and shells, with like bases and like shells stacked together and then the bases stacked within the shells into a small, compact storage unit.

The electric luminaria of the present invention uniquely receives a decorative sleeve carrying any color and/or decorative indicia to enable the electric luminaria of the present invention to be employed on multiple occasions throughout the year, such as holidays, special events, religious feast days, etc.

What is claimed is:

1. A luminaria usable with lights mounted in light sockets spaced along an electric conductor the luminaria comprising:

a shell having a side wall and a hollow interior;

a light support member mountable in the bottom of the shell and within the interior of the shell, the light support member adapted for supporting a light socket in the shell; and radially outward extending flanges on the shell and the light support member interconnecting the shell and the light support member.

2. The luminaria of claim 1 wherein:

the shell has a plurality of joined sidewalls forming a continuous sidewall about the hollow interior, a closed end and an opposed open end.

3. The luminaria of claim 1 wherein the the flanges are complementary flanges formed on the shell and the light support means.

4. The luminaria of claim 1 further comprising:

alignable apertures formed in the flanges; and means, insertable through the aligned apertures into the ground, for anchoring each shell and light support member to the ground.

5. The luminaria of claim 1 wherein the light support member comprises;

a base having a peripheral flange and a sidewall extending from the flange;

a light socket receiving receptacle formed at one end of the sidewall.

6. The luminaria of claim 5 further comprising:

a pair of opposed apertures formed in the receptacle adapted for receiving the electrical conductor of a light string therethrough.

7. The luminaria of claim 5 wherein:

the sidewall of the base tapers inward from the flange to the receptacle.

8. The luminaria of claim 1 further comprising:

a decorative member removably replaceable about the sidewall of the shell.

9. The luminaria of claim 8 wherein the decorative member comprises:

a sleeve having at least one open end insertable over the sidewall of the shell.

10. A luminaria usable with a light mounted in one of a plurality of light sockets spaced along an electric conductor, the luminaria comprising:

a shell having a sidewall surrounding a hollow interior chamber and a flange at one end surrounding an aperture opening to the hollow interior chamber, the flange extending radially outward from the sidewall;

a base having a flange at one end complementary to the flange on the shell, and a receptacle at an opposed end adapted for supporting one light socket;

the base oriented to dispose the receptacle within the hollow interior chamber of the shell and the flange of the base in registry with the flange on the shell; and means for stationarily fixing the shell and base to the ground.

11. The luminaria of claim 10 wherein the fixing means comprises:

stake means, insertable through the flanges of the base and shell, to fix the base and the shell to the ground.

12. A luminaria for use with lights mounted in a plurality of light sockets spaced along an electric conductor, the luminaria made by the process comprising the steps of:

molding a one-piece hollow container having a base at one end terminating in a neck, an intermediate, radially outwardly extending flange at one end of the base and a closed end shell extending from the flange;

separating the base from the shell at the flange to form a peripheral flange at one end of the base and at one end of the shell;

inverting the base from its manufactured position relative to the shell;

inserting a light socket into the neck of the base;

disposing the base within the interior of the shell by bringing the peripheral flanges of the base and the shell into mating engagement.

13. The process of claim 12 further comprising the steps of:

initially forming the flanges with an interconnecting, integral edge; and the step of separating the flange on the shell from the flange on the base including the step of cutting the integral edge.

14. The process of claim 13 further comprising the step of:

removably disposing a decorative member about the exterior side wall of the shell.

15. The process of claim 12 wherein the step of molding a one-piece hollow container comprises the step of blow molding the one piece hollow container.

* * * * *